US008267757B2

(12) United States Patent
Seto et al.

(10) Patent No.: US 8,267,757 B2
(45) Date of Patent: Sep. 18, 2012

(54) VEHICULAR AIR CONDITIONING APPARATUS

(75) Inventors: Takahiro Seto, Utsunomiya (JP); Hiroto Suzuki, Tochigi-ken (JP); Junichi Kanemaru, Columbus, OH (US); Shinji Kakizaki, Dublin, OH (US)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 571 days.

(21) Appl. No.: 12/500,781

(22) Filed: Jul. 10, 2009

(65) Prior Publication Data

US 2011/0009044 A1    Jan. 13, 2011

(51) Int. Cl.
  *B60H 1/00*   (2006.01)
  *B62D 25/00*   (2006.01)
(52) U.S. Cl. ........................................ 454/143; 296/192
(58) Field of Classification Search .................. 454/143; 296/192
See application file for complete search history.

(56) References Cited

U.S. PATENT DOCUMENTS

| 5,309,731 | A | 5/1994 | Nonoyama et al. |
| 2004/0031279 | A1* | 2/2004 | Kamiya et al. .................. 62/244 |
| 2010/0052364 | A1* | 3/2010 | Cavanaugh .................... 296/192 |
| 2010/0210202 | A1* | 8/2010 | Kakizaki et al. .............. 454/121 |
| 2011/0005732 | A1* | 1/2011 | Seto .............................. 165/121 |
| 2011/0009044 | A1* | 1/2011 | Seto et al. ...................... 454/143 |

FOREIGN PATENT DOCUMENTS

| JP | 05-178068 | 7/1993 |
| JP | 06-040236 | 2/1994 |
| JP | 06-191257 | 7/1994 |
| JP | 10-138737 | 5/1998 |
| JP | 2001-171329 | 6/2001 |

* cited by examiner

*Primary Examiner* — Steven B McAllister
*Assistant Examiner* — Helena Kosanovic
(74) *Attorney, Agent, or Firm* — Rankin, Hill & Clark LLP

(57) ABSTRACT

In a vehicular air conditioning apparatus, a first blower unit is connected by a connection duct to a side portion of a casing constituted by respective air passages, and a second blower unit separate from the first blower unit is connected to a lower portion of the casing. The first blower unit adjusts an inflow rate of external air by means of an adjustment damper, which is disposed to face toward an opening of a duct, and the external air flows into the casing through an intake damper.

6 Claims, 5 Drawing Sheets

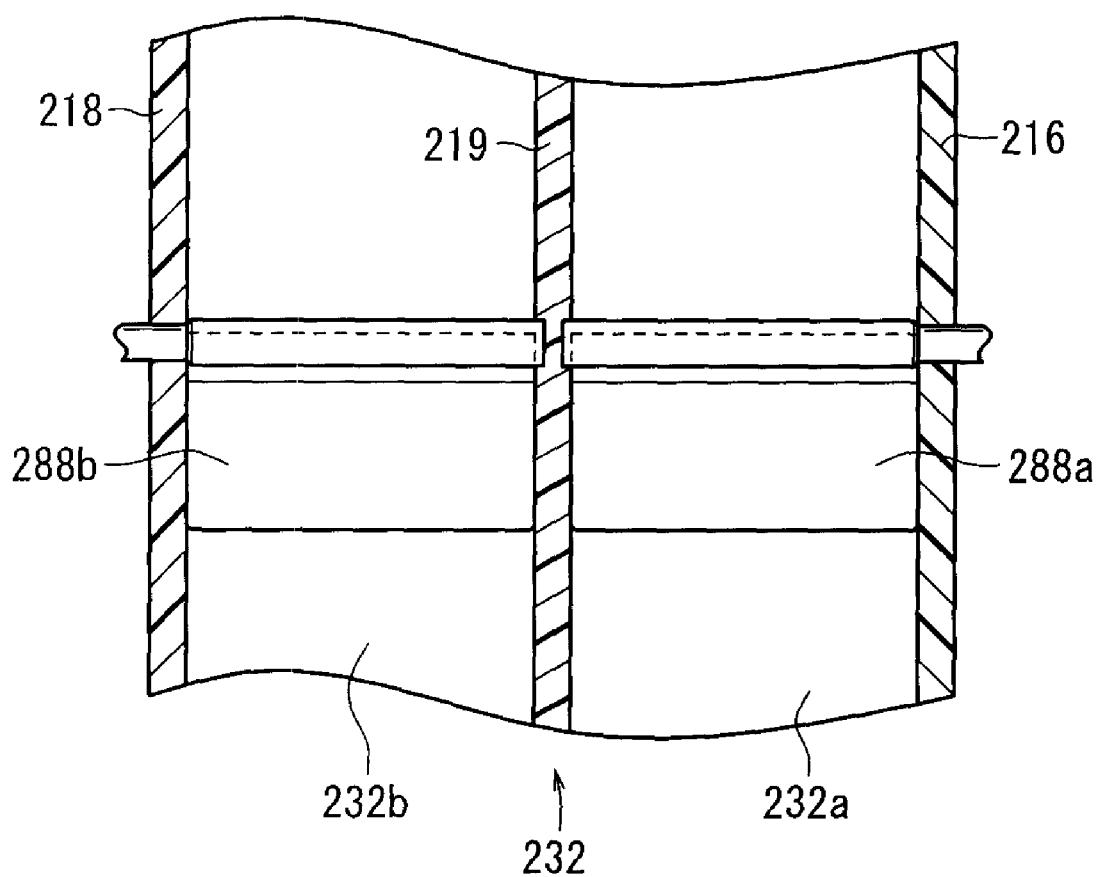

VEHICULAR AIR CONDITIONING APPARATUS

BACKGROUND OF THE INVENTION

1. Field of the Invention

The present invention relates to a vehicular air conditioning apparatus mounted in a vehicle for blowing air into a vehicle compartment that has been adjusted in temperature by a cooling means or a heating means, for thereby adjusting temperature of the vehicle compartment.

2. Description of the Related Art

In a vehicular air conditioning apparatus that is mounted in a vehicle, internal and external air is introduced into a casing by a blower, and after cooled air, which has been cooled by an evaporator that forms a cooling means, and heated air, which has been heated by a heater core that forms a heating means, are mixed together in the casing at a predetermined mixing ratio, the mixed air is blown out from a defroster blow-out port, a face blow-out port, or a foot blow-out port, whereby adjustment of temperature and humidity in the vehicle compartment is carried out.

With this type of vehicular air conditioning apparatus, for example, it is known to provide a first blower for the purpose of introducing vehicle compartment air into the casing, and a second blower for the purpose of introducing external air outside of the vehicle compartment into the casing. In such a vehicular air conditioning apparatus, air that is introduced from an internal air introduction port by rotation of the first blower is heated by a first heat exchanger and then is blown into the vehicle compartment through a first air passage from the face blow-out port or the foot blow-out port. In addition, air that is introduced from an external air introduction port by rotation of the second blower is heated by a second heat exchanger and then is blown into the vehicle compartment through a second air passage from the defroster blow-out port. More specifically, a switching operation is performed such that when air is blown out from the face blow-out port or the foot blow-out port, the first blower is driven and air from the interior of the vehicle is introduced, whereas when air is blown out from the defroster blow-out port, the second blower is rotated and external air is introduced.

Further, using separate air conditioning devices having first and second blowers for introducing air, the first blower is arranged facing toward an external air introducing port of a duct, and the second blower is arranged facing toward an interior air introducing port. Additionally, the first blower includes a switching means, which is capable of switching the air that is introduced to the duct by the first blower between interior air and exterior air.

Moreover, the air that is introduced to the duct by the first blower is switched between interior air and exterior air by the switching means, and after the air has been adjusted in temperature by the heating means and the cooling means so as to provide a desired temperature together with the air introduced to the duct by the second blower, the air is blown into a desired region in the vehicle compartment through a face blow-out port, a foot blow-out port, or a defroster blow-out port (See, for example, Japanese Laid-Open Patent Publication No. 05-178068, Japanese Laid-Open Patent Publication No. 06-040236, and Japanese Laid-Open Patent Publication No. 06-191257).

Further, for example, in the vehicular air conditioning apparatus disclosed in Japanese Laid-Open Patent Publication No. 10-138737 and Japanese Laid-Open Patent Publication No. 2001-171329, an external air mode and an internal air mode can be selected by operating an internal/external air switching damper. However, when the external air mode is selected, since the air pressure applied to the front of the moving vehicle, i.e., ram pressure, becomes larger depending on the vehicle speed, when the vehicle is running at a high velocity, the amount of air that flows into the vehicle cabin increases, thus producing an effect on the temperature control capability of the vehicular air conditioning apparatus. For this reason, a butterfly type of ram pressure-adjustment damper is utilized as an internal/external air switching damper, and a control (hereinafter referred to as a "ram pressure control") is performed, so that the amount of external air introduced to the vehicle compartment remains fixed, or changes no more than necessary.

Since the ram pressure increases corresponding to the vehicle velocity, for maintaining the intake amount of external air constant, it is required to make the opening area of the external air intake port smaller in response to the vehicle velocity. However, in the vehicular air conditioning apparatus disclosed in the aforementioned Japanese Laid-Open Patent Publication No. 06-191257 and Japanese Laid-Open Patent Publication No. 10-138737, when air is taken in from the exterior, since the air is introduced so as to face toward a flat surface of the ram pressure-adjustment damper, the flow rate of air is throttled by the ram pressure-adjustment damper while being drawn into the air conditioning apparatus. More specifically, a structure is provided in which external air is introduced from a substantially perpendicular direction with respect to the longitudinal direction of the ram pressure-adjustment damper.

Owing thereto, the ram pressure-adjustment damper is blown upon and agitated by the ram pressure when the vehicle is running, and the opening of the ram pressure-adjustment damper is changed from a preset target opening, and thus cases occur in which errors are generated between the target opening and the actual opening. As a result, it is difficult for the introduction of external air to be adjusted properly by the ram pressure-adjustment damper and for external air to be introduced correctly into the air conditioning apparatus.

Further, when the ram pressure-adjustment damper is driven, for example, by an actuator, the ram pressure acts in resistance to driving of the ram pressure-adjustment damper, so that a comparatively large torque is needed. Thus, an actuator capable of generating such a large torque has been adopted, which tends to increase the size and scale of the actuator.

SUMMARY OF THE INVENTION

A general object of the present invention is to provide a vehicular air conditioning apparatus having a simple structure, which is capable of introducing external air at a fixed amount easily and stably, irrespective of the running speed of the vehicle.

For achieving the aforementioned object, the present invention is characterized by a vehicular air conditioning apparatus including a casing mounted in a vehicle and having a plurality of passages in the interior thereof through which air flows, a heat exchanger disposed in the interior of the casing for carrying out heat exchange on the air, an internal/external air switching damper disposed in the interior of the casing for performing switching of an external air introducing port for taking in air from an exterior portion of the vehicle, an internal air introducing port for taking in air from an interior portion of the vehicle, and performing switching of internal and external air, an adjustment damper disposed upstream from the external air introducing port for adjusting a supply amount of air introduced into the casing, and a duct disposed upstream of the adjustment damper for taking in air that is introduced to the interior of the casing, wherein the adjustment damper is formed as a plate, an axis of rotation being disposed at one end thereof, and another end thereof on an opposite side from the one end being arranged so as to confront the air that is introduced through the duct.

According to the present invention, in a casing mounted in a vehicle and having a plurality of passages through which air flows, an internal/external air switching damper for performing switching of an external air introducing port for taking in air from an exterior portion of the vehicle, an internal air introducing port for taking in air from an interior portion of the vehicle, and for performing switching of internal and external air, is provided together with an adjustment damper disposed upstream from the external air introducing port for adjusting a supply amount of air introduced into the casing. Air, which is taken in from a duct disposed upstream of the adjustment damper, after having been adjusted by the adjustment damper, is introduced into the casing interior. Further, the adjustment damper is formed as a plate, with an axis of rotation being disposed at one end thereof, and another end thereof on an opposite side from the one end being arranged so as to confront the air that is introduced through the duct.

Accordingly, since the adjustment damper, which is supported at one end thereof by the axis of rotation, is utilized, while the other end thereof is disposed so as to confront the air that is taken in from the duct, even in the case that the vehicle is running at a high speed, the adjustment damper is not blasted and agitated by air that is taken in from the duct, and the adjustment damper can be maintained at its preset target opening. Therefore, air that is taken in from the duct can be supplied into the casing stably at a fixed amount.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a partial cross sectional view taken along line V-V of FIG. 2.

DESCRIPTION OF THE PREFERRED EMBODIMENTS

Figure 1:
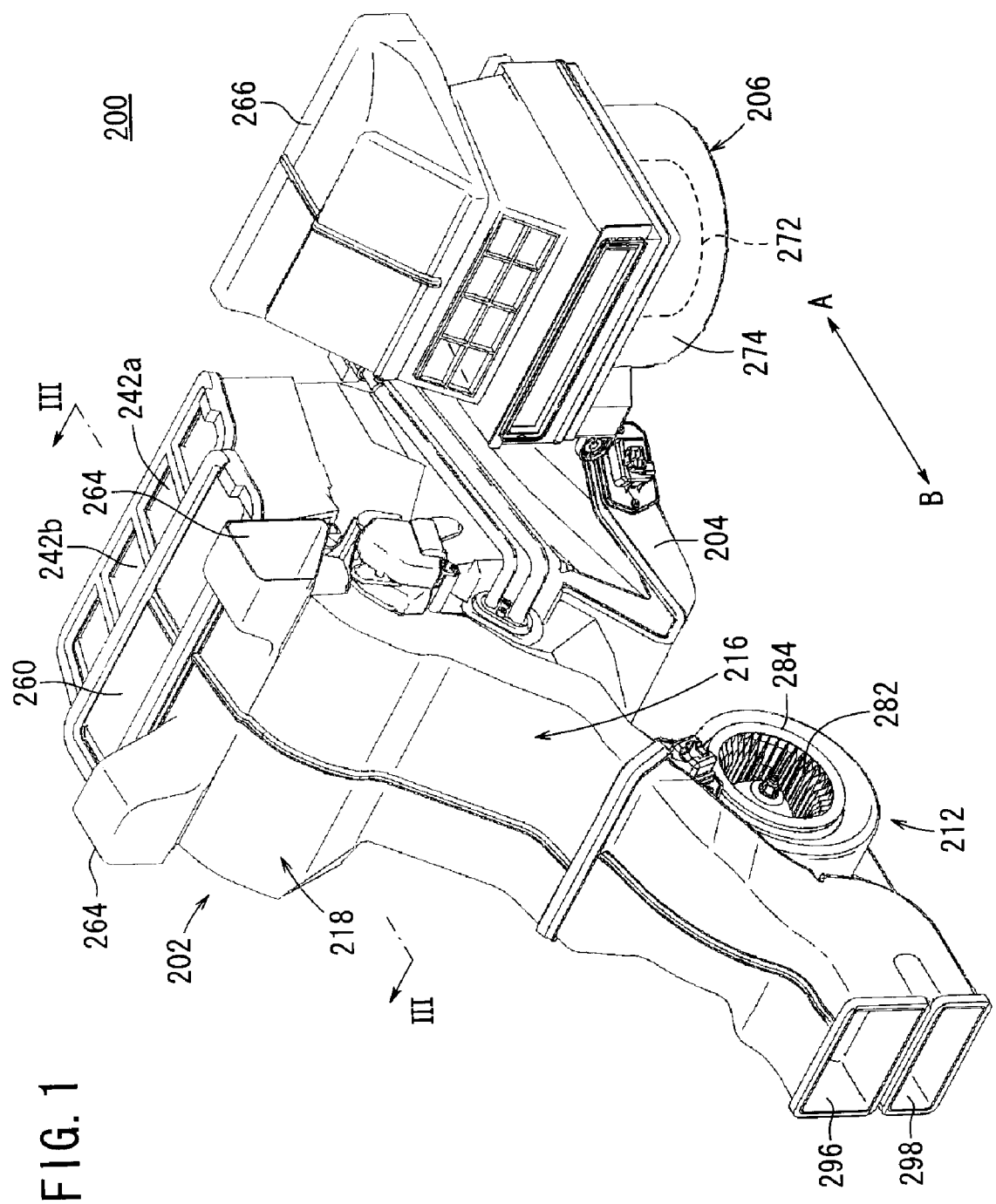
FIG. 1 is an external perspective view of a vehicular air conditioning apparatus according to an embodiment of the present invention.

A preferred embodiment of the vehicular air conditioning apparatus according to the present invention shall be presented and described below with reference to the accompanying drawings. In FIG. 1, reference numeral 200 indicates a vehicular air conditioning apparatus according to a first embodiment of the present invention. The vehicular air conditioning apparatus 200, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
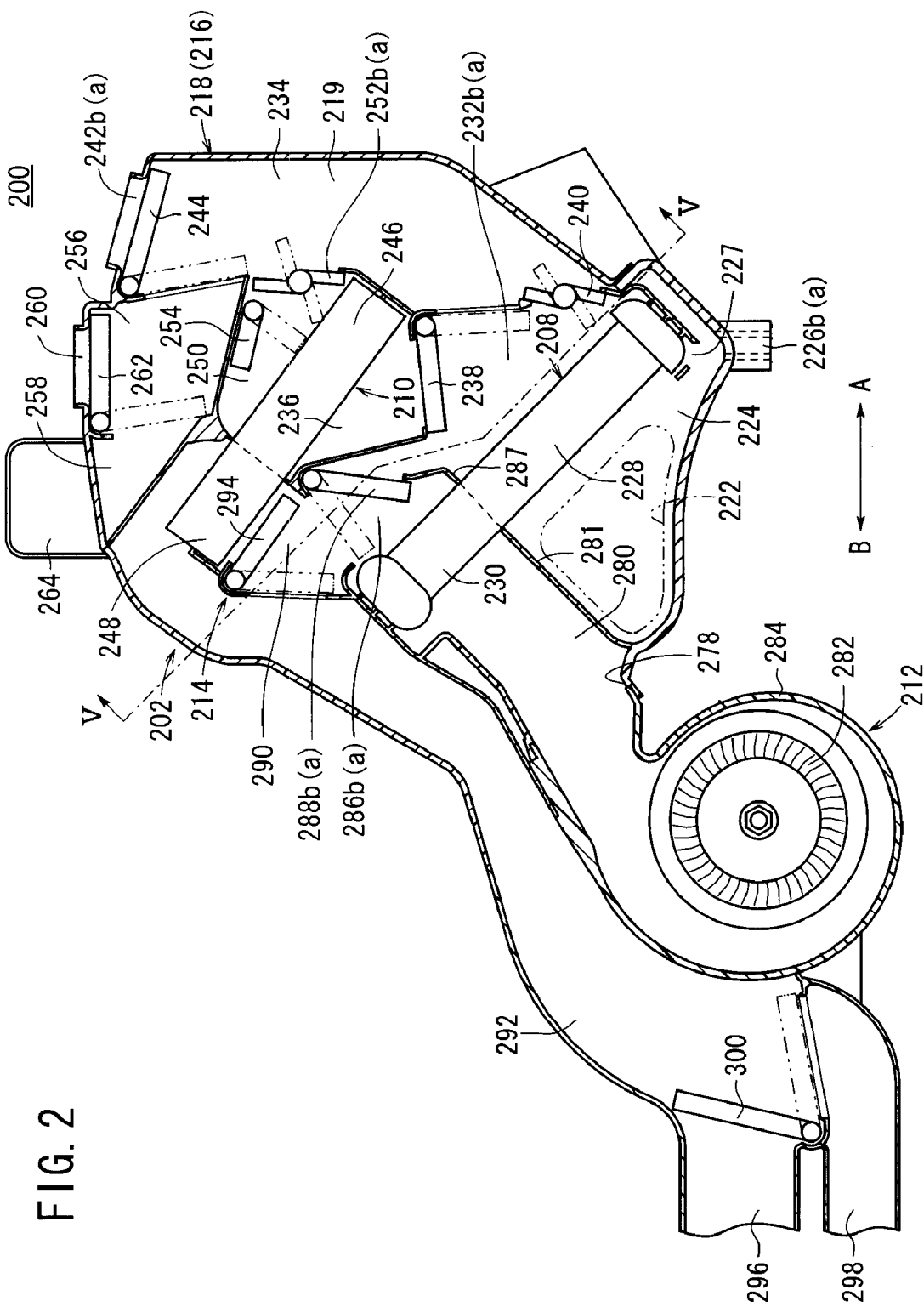
FIG. 2 is an overall cross sectional view of the vehicular air conditioning apparatus shown in FIG. 1.

Further, the vehicular air conditioning apparatus 200 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

In the present embodiment, inside the casing, plural rotating members made up of dampers or the like are provided, wherein the rotating members are operated by rotational drive sources such as motors or the like. Herein, for purposes of simplification, depictions and explanations concerning such rotational drive sources have been omitted.

As shown in FIGS. 1 and 2, the vehicular air conditioning apparatus 200 includes a casing 202 constituted by respective air passages, a first blower unit 206 connected via a connection duct 204 to a side portion of the casing 202 for blowing air toward the front seats of the vehicle, an evaporator (cooling means) 208 arranged in the interior of the casing 202 for cooling air, a heater core (heating means) 210 for heating the air, a second blower unit 212 connected to a lower part of the casing 202 for blowing air to the middle seats and rear seats of the vehicle, and a damper mechanism 214 for switching the flow of air that flows through each of the aforementioned passages.

The casing 202 is constructed from first and second divided casings 216, 218 having substantially symmetrical shapes, and a center plate 219 disposed between the first divided casing 216 and the second divided casing 218. A first intake port 222 connected to the connection duct 204, and to which air is supplied from the first blower unit 206, is formed at a lower side portion of the first divided casing 216. The first intake port 222 communicates with a first front passage 224 disposed on an upstream side of the evaporator 208.

As shown in FIG. 2, the evaporator 208, which is disposed on the downstream side of the first front passage 224, is disposed to straddle between the first divided casing 216 and the second divided casing 218. One end thereof in the forward direction of the vehicle (the direction of arrow A) is inclined downward at a predetermined angle with respect to the other end thereof in the rearward direction (the direction of arrow B) of the vehicle.

The evaporator 208 includes a first cooling section 228 that faces the first front passage 224 and which cools air that is supplied from the first front passage 224, and a second cooling section 230 that faces a later-described first rear passage 280 and which cools air that is supplied from the first rear passage 280. The first cooling section 228 and the second cooling section 230 are separated by a non-illustrated partitioning means, so that air flowing from the first front passage 224 into the evaporator 208 and air flowing from the first rear passage 280 into the evaporator 208 do not mix together mutually inside the evaporator 208.

On the other hand, a second front passage 232 supplied with air that has passed through the first cooling section 228 is formed on the downstream side of the evaporator 208. Upwardly of the second front passage 232, a third front passage 234 and a fourth front passage 236 are formed in a branching or bifurcated fashion. Further, a first air mixing damper 238 is disposed rotatably in the second front passage 232, so as to face toward the branching portion of the third front passage 234 and the fourth front passage 236. By rotation of the first air mixing damper 238, the blowing condition and blowing rate of the cooled air that has passed through the evaporator 208 into the third front passage 234 and the fourth front passage 236 is adjusted. The third front passage 234 is arranged in a forward direction (the direction of arrow A), whereas the fourth front passage 236 is arranged in a rearward direction (the direction of arrow B), of the casing 202. The heater core 210 is disposed on a downstream side of the fourth front passage 236.

Upstream of the third front passage 234, a cooling vent damper 240 is disposed in a downward direction facing the second front passage 232. The cooling vent damper 240 is formed from a butterfly valve, which is rotatable about a central axis, for switching a communication state between the second front passage 232 and the third front passage 234. More specifically, because the cooling vent damper 240 is arranged in the vicinity of the evaporator 208, the cooling vent damper 240 is disposed such that, under a switching action thereof, chilled air cooled by the evaporator 208 is supplied directly into the third front passage 234.

Further, the third front passage 234 extends upwardly, and a first vent blow-out port 242 opens at an upper portion on the downstream side thereof, where a vent damper 244 is rotatably disposed. The vent damper 244 switches a blowing state of air that flows through the third front passage 234, when air is blown to the first vent blow-out port 242 and to a later-described sixth front passage 256, and also is capable of adjusting the blowing rate thereof.

The heater core 210, similar to the evaporator 208, is arranged so as to straddle between the first divided casing 216 and the second divided casing 218, and is disposed such that one end thereof in the forward direction of the vehicle (the direction of arrow A) is inclined downward at a predetermined angle with respect to the other end thereof in the rearward direction (the direction of arrow B) of the vehicle. The heater core 210 includes a first heating section 246 that faces the fourth front passage 236 and which heats air that is supplied from the fourth front passage 236, and a second heating section 248 that faces a third rear passage 290 (to be described later) and which heats air that is supplied from the third rear passage 290. The first heating section 246 and the second heating section 248 are separated by a non-illustrated partitioning means, so that air flowing from the fourth front passage 236 to the heater core 210 and air flowing from the third rear passage 290 to the heater core 210 do not mix together mutually inside the heater core 210.

On the downstream side of the heater core 210, a fifth front passage 250 (first passage) is formed. The fifth front passage 250 extends in the forward direction (in the direction of arrow A), and at a location that merges with the downstream side of the third front passage 234, temperature control dampers 252a, 252b are provided, and together therewith, a sub-defroster damper 254 is disposed in an upward direction facing the heater core 210. The temperature control dampers 252a, 252b, similar to the cooling vent damper 240, are formed from a butterfly valve rotatable about a central axis, for switching a communication state between the fifth front passage 250 and the third front passage 234 upon rotation thereof, and for deflecting the blowing direction of warm air supplied from the fifth front passage 250 into the third front passage 234.

On the other hand, the sub-defroster damper 254 is disposed so as to be capable of switching a communication state between the fifth front passage 250 and the sixth front passage 256 (second passage) formed thereabove. By rotating the sub-defroster damper 254 and thereby establishing communication between the fifth front passage 250 and the sixth front passage 256, that is, by shortening the flow path from the fifth front passage 250 to the sixth front passage 256, in a state in which air resistance is reduced, warm air heated by the heater core 210 can be supplied directly to the sixth front passage 256 without flowing through the third front passage 234. Owing thereto, in the case that the heat mode for blowing air in the vicinity of the feet of passengers, or the defroster mode for blowing air in the vicinity of the front window of the vehicle, is selected, the blowing rate can be increased to quickly heat such areas. Stated otherwise, by reducing the influence of ventilation resistance by bending the passage, even without increasing the rotation of the first blower unit 206, the blowing rate of air in the heat mode for blowing air in the vicinity of the feet of passengers, or in the defroster mode for blowing air in the vicinity of the front window of the vehicle, can be increased. Furthermore, since the flow path from the fifth front passage 250 to the sixth front passage 256 is shortened, loss of heat from the warm air heated by the heater core 210 is reduced as much as possible when air is blown from the defroster blow-out port 260 to the front seats, resulting in increased heating performance in the heat mode and the defroster mode. Moreover, by arranging the sub-defroster damper 254 upwardly of the heater core 210, and arranging the defroster blow-out port 260 further upwardly thereof, the flow of warm air is made substantially linear, such that the ventilation resistance when the warm air flows therethrough can be reduced even more.

The sixth front passage 256 communicates with the downstream side of the third front passage 234 through the forwardly disposed opening, and communicates with a seventh front passage 258 through the rearwardly disposed opening. Further, a defroster blow-out port 260 opens upwardly of the sixth front passage 256, and a defroster damper 262 is disposed rotatably facing the defroster blow-out port 260. The defroster damper 262 switches the blowing state of air that is supplied to the sixth front passage 256 from the third and fifth front passages 234, 250 when air is blown to the defroster blow-out port 260 and to the seventh front passage 258, and further is provided to enable the blowing rate thereof to be adjusted.

More specifically, with the vehicular air conditioning apparatus 200, the first vent blow-out port 242 and the defroster blow-out port 260 open upwardly of the casing 202, and are disposed substantially centrally in the casing 202, with the first vent blow-out port 242 being positioned on the forward side (in the direction of arrow A), and the defroster blow-out port 260 being positioned rearwardly thereof (in the direction of arrow B) with respect to the first vent blow-out port 242.

The seventh front passage 258 communicates with a first heat blow-out port (not shown) for blowing air through a heat passage 264 in the vicinity of the feet of passengers riding in the front seats (driver's seat, passenger seat) of the vehicle compartment.

Figure 4:
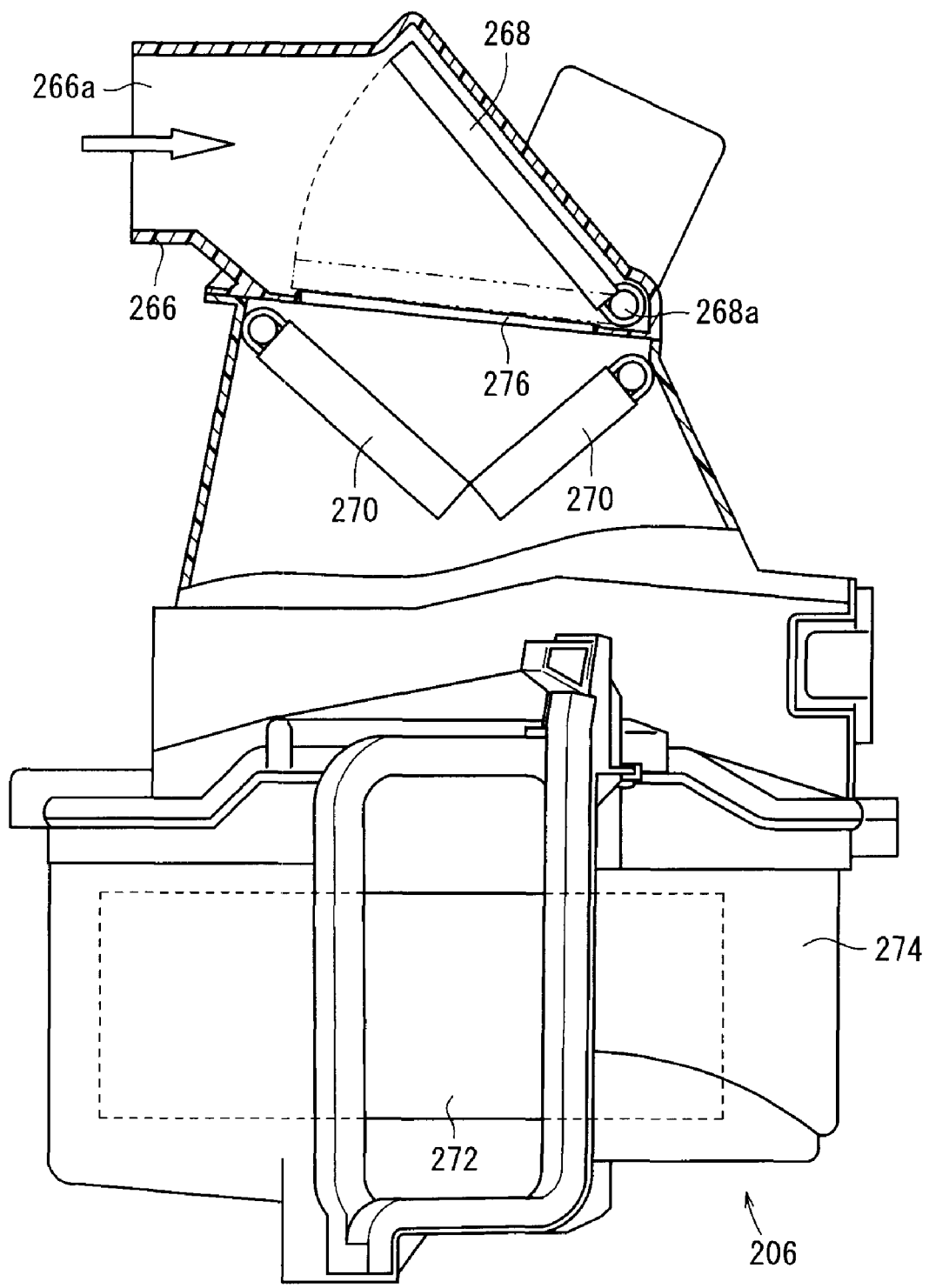
FIG. 4 is an enlarged side view of a first blower unit in the vehicular air conditioning apparatus shown in FIG. 1.

As shown in FIGS. 1 and 4, the first blower unit 206 comprises a duct 266 disposed at an inlet thereof for introducing exterior air, an adjustment damper 268 for adjusting the intake rate of air taken in through the duct 266, an intake damper 270 disposed on a downstream side of the adjustment damper 268 for carrying out switching between interior and exterior air, and a first blower fan 272 for supplying air taken in from the duct 266 or the like to the interior of the casing 202. A blower case 274 in which the first blower fan 272 is accommodated is connected with the connection duct 204, which in turn is connected to the first intake port 222, and communicates with the interior of the casing 202. Rotation of the first blower fan 272 is controlled by a fan motor (not shown), which is driven by supply of electrical power thereto.

The adjustment damper 268 is disposed to face toward an opening 266a of the duct 266, and is openable and closable under an urging action of a non-illustrated rotary power source via a support shaft (axis of rotation) 268a, which is supported on the downstream side of the duct 266. Stated otherwise, the adjustment damper 268 is disposed so as to confront the direction in which the exterior air is introduced. In addition, through rotation of the adjustment damper 268 by a predetermined angle upwardly from the closed condition blocking a communication hole 276 (the state shown by the two-dot-dash line in FIG. 4), which opens on an upper surface of the blower case 274, the flow rate of intake air to the side of the blower case 274 through the adjustment damper 268 and the communication hole 276 is adjusted. Moreover, an end on the opposite side of the adjustment damper 268 from the support shaft 268a is arranged to face toward and confront the air that is drawn in from the duct 266. More specifically, since the flow of air that is drawn in from the duct 266 is substantially parallel with the adjustment damper 268, air pressure is not received in a direction perpendicular with respect to the flat surface of the adjustment damper 268, and the adjustment damper 268 can be rotated without requiring a large driving force. In this case, the direction of extension of the duct 266 and the adjustment damper 268 may be arranged substantially in parallel.

For example, the running speed of the vehicle is detected by a vehicle speed sensor (not shown), and by adjusting the rotation angle (rotation amount) of the adjustment damper 268 based on the running speed, the flow rate of air that is introduced into the casing 202 from the exterior of the vehicle through the duct 266 is controlled to attain a fixed rate independently of the vehicle running speed.

More specifically, when the vehicle runs at a high speed, since the rate of air taken in from the duct 266 increases, the opening degree of the adjustment damper 268 is made smaller, and the flow rate of air (external air) supplied to the side of the blower case 274 is restricted. On the other hand, when the vehicle runs at a low speed, since the rate of air taken in from the duct 266 decreases compared to when the vehicle runs at a high speed, the opening degree of the adjustment damper 268 is controlled to become larger, so that a greater amount of air (external air) is taken into the interior of the blower case 274.

The relationship between the vehicle velocity and the angle of rotation of the adjustment damper 268 may be determined from measurement data, or may also be determined by a numerical analytic method from a value Cd representing a drag coefficient of the air, or a Bernoulli equation or the like, which represents a law of energy conservation relating to the fluid.

As described above, air that is supplied from the first blower unit 206 is introduced to the interior of the casing 202 through the connection duct 204 and the first intake port 222, and under rotating actions of the first air mixing damper 238, the vent damper 244, the defroster damper 262, the temperature control dampers 252a, 252b and the sub-defroster damper 254, which collectively constitute the damper mechanism 214, air is supplied selectively to the defroster blow-out port 260, the first vent blow-out port 242 and the heat passage 264, which are capable of blowing air to the front and middle seats inside the vehicle through the first through seventh front passages 224, 232, 234, 236, 250, 256 and 258.

On the other hand, in a lower portion of the casing 202, as shown in FIG. 2, a second intake port 278 through which air is supplied from the second blower unit 212 is formed at a rearward side (in the direction of arrow B) perpendicular to the first intake port 222. The second intake port 278 opens at a position on an upstream side of the evaporator 208, and communicates with the first rear passage 280, and further, is formed alongside the first intake port 222 via the first rear passage 280 and a first dividing wall 281.

The second blower unit 212 includes a second blower fan 282, which takes in air (internal air) from the vehicle compartment and supplies the intake air into the interior of the casing 202. A blower case 284 in which the second blower fan 282 is accommodated is connected to the second intake port 278 of the casing 202, and communicates with the first rear passage 280. In the same manner as the first blower fan 272, rotation of the second blower fan 282 is controlled by a fan motor (not shown), which is driven by supply of electrical power thereto.

On a downstream side of the first rear passage 280, a second rear passage 286 is formed through which air having passed through the second cooling section 230 of the evaporator 208 is supplied. The second rear passage 286 is separated from the second front passage 232 by a second dividing wall 287, wherein the second dividing wall 287 extends to a partition means of the evaporator 208. Owing thereto, on the downstream side of the evaporator 208 as well, air that passes through the first rear passage 280 and flows to the second cooling section 230 of the evaporator 208 does not intermix mutually with air that passes through the first front passage 224 and flows to the first cooling section 228 of the evaporator 208.

Figure 3:
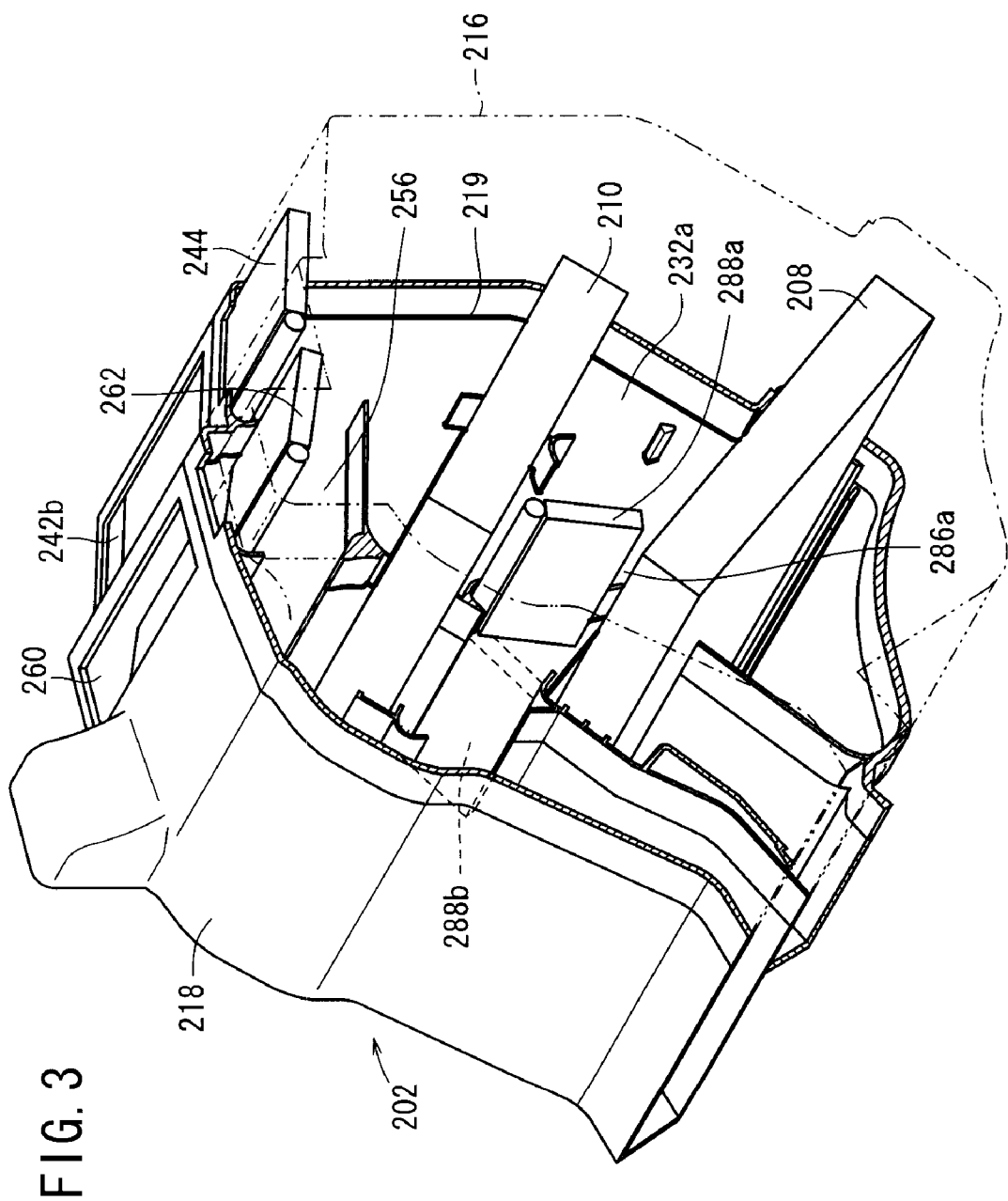
FIG. 3 is a cross sectional view taken along line III-III of FIG. 1.

Herein, as shown in FIG. 3, the second rear passage 286, the second front passage 232 and the first vent blow-out port 242 are separated respectively on sides of the first and second divided casings 216, 218 about a center plate 219, which is disposed in the center of the casing 202, thereby forming a second rear passage 286a and a second rear passage 286b, a second front passage 232a and a second front passage 232b, and a first vent blow-out port 242a and a first vent blow-out port 242b. Furthermore, a pair of communication switching dampers 288a, 288b, which are capable of switching communication states with the second front passage 232a and the second front passage 232b, are disposed in the second rear passage 286a and the second rear passage 286b, wherein one of the communication switching dampers 288a is rotatably controlled separately and independently from the other communication switching damper 288b, which is also rotatably controlled separately and independently (see FIG. 5).

In addition, by rotation of the pair of communication switching dampers 288a, 288b, the second rear passage 286 for blowing air to the middle and rear seats in the vehicle compartment and the second front passage 232 for blowing air to the front seats in the vehicle compartment are brought into mutual communication with each other. Together therewith, by changing, respectively, the rotation amount of one of the communication switching dampers 288a and the rotation amount of the other of the communication switching dampers 288b, for example, the blowing rate of air blown to the passenger seat side of the front seats through the second front passage 232a and from the first vent blow-out port 242a, and the blowing rate of air blown to the driver's seat side of the front seats through the second front passage 232b and from the first vent blow-out port 242b, as well as the blowing temperatures thereof, can be controlled separately from each other.

On a downstream side from the second rear passage 286, a third rear passage 290 facing the heater core 210 is formed. The third rear passage 290 opens onto a side of the heater core 210, and further, opens alongside a fourth rear passage 292 adjacent thereto. In addition, a second air mixing damper 294, which mixes, at a predetermined mixing ratio, cool air and warm air supplied to the third rear passage 290, to thereby form mixed air, is disposed rotatably in the third rear passage 290. The second air mixing damper 294 switches the communication state between the third rear passage 290 and the upstream or downstream side of the fourth rear passage 292, which is connected to a downstream side of the heater core 210. Consequently, by rotating the second air mixing damper 294, cool air that is cooled by the evaporator 208 and supplied to the third rear passage 290 and warm air that is heated by the heater core 210 and which flows through the fourth rear passage 292 are mixed at a predetermined mixing ratio within the fourth rear passage 292, and are blown out therefrom.

In other words, an intermediate location of the fourth rear passage 292 functions as a mixing section for mixing warm air and cool air, which is then blown out to the middle seats and rear seats in the vehicle compartment.

The fourth rear passage 292, after curving around so as to circumvent the end portion of the heater core 210, extends downwardly while curving to avoid an upper part of the second blower unit 212. Additionally, a downstream side of the fourth rear passage 292 communicates with the fifth and sixth rear passages 296, 298 at a branching location of the fifth and sixth rear passages 296, 298, at which a rotatable mode switching damper 300 is disposed. By rotating the mode switching damper 300, the communication state of the fourth rear passage 292 with the fifth or sixth rear passages 296, 298 is switched.

The fifth and sixth rear passages 296, 298 extend respectively in the rearward direction (the direction of arrow B) of the vehicle. The fifth rear passage 296 communicates with a second vent blow-out port (not shown), which serves to blow air in the vicinity of faces of passengers in the middle seats of the vehicle. On the other hand, the sixth rear passage 298 communicates with second and third heat blow-out ports (not shown) that serve to blow air in the vicinity of the feet of passengers in the middle and rear seats.

More specifically, air that is supplied from the second blower unit 212 is introduced to the interior of the casing 202 through the second intake port 278. The air then is selectively supplied to a second vent blow-out port, and to the second and third heat blow out ports (not shown), which are capable of blowing air to the middle seats and rear seats in the vehicle, through the first through sixth rear passages 280, 286, 290, 292, 296, 298, under rotary actions of the second air mixing damper 294 and the mode switching damper 300 that constitute the damper mechanism 214.

Moreover, because the aforementioned second to seventh front passages 232, 234, 236, 250, 256, 258 and the second rear passage 286 are divided in half at a substantially central portion of the casing 202 by the center plate 219, the second to seventh front passages 232, 234, 236, 250, 256, 258 and the second rear passage 286 are disposed respectively in the interiors of the first and second divided casings 216, 218.

The vehicular air conditioning apparatus 200 according to the embodiment of the present invention is basically constructed as described above. Next, explanations shall be made concerning operations and effects of the present invention.

First, when operation of the vehicular air conditioning apparatus 200 is started, the first blower fan 272 of the first blower unit 206 is rotated upon supply of electricity to a non-illustrated rotary drive source, and air (interior or exterior air) that is taken in through the duct 266 is supplied to the first front passage 224 of the casing 202 through the connection duct 204. Simultaneously, air (interior air) that is taken in by rotation of the second blower fan 282 of the second blower unit 212 upon supply of electricity with respect to a non-illustrated rotary drive source is supplied to the first rear passage 280 from the blower case 284 while passing through the second intake port 278. In the following descriptions, the air supplied to the interior of the casing 202 by the first blower fan 272 shall be referred to as "first air," and the air supplied to the interior of the casing 202 by the second blower fan 282 shall be referred to as "second air."

The first air and the second air supplied to the interior of the casing 202 are each cooled by passing respectively through the first and second cooling sections 228, 230 of the evaporator 208, and flow respectively as chilled air to the second front passage 232 and the second rear passage 286, in which the first air mixing damper 238 and the communication switching dampers 288a, 288b are disposed. In this case, because the interior of the evaporator 208 is divided into the first cooling section 228 and the second cooling section 230 by a non-illustrated partitioning means, the first air and the second air do not mix with one another.

Herein, for example, in the case that a vent mode is selected by a vehicle occupant for blowing air in the vicinity of the faces of passengers, due to the first air mixing damper 238 blocking communication between the second front passage 232 and the fourth front passage 236, the first air (cooled air) flows from the second front passage 232 and through the third front passage 234. In this case, since it is unnecessary for warm air that is supplied to the fifth front passage 250 to be mixed with respect to the cool air in the third front passage 234, the temperature control dampers 252a, 252b are rotated so as to be substantially parallel with the third front passage 234, thereby blocking communication between the fifth front passage 250 and the third front passage 234. In addition, since the vent damper 244 is rotated and communication between the third front passage 234 and the sixth front passage 256 is blocked, the first air (cooled air) that flows into the third front passage 234 is blown out from the opened first vent blow-out port 242 in the vicinity of the faces of passengers in the front seats in the vehicle compartment.

On the other hand, since the communication switching dampers 288a, 288b block communication between the second front passage 232 and the second rear passage 286, the second air (cooled air) flows from the second rear passage 286 and to the third rear passage 290. Furthermore, because the second air mixing damper 294 blocks the flow of second air to the heater core 210, the second air (cooled air) flows from the third rear passage 290, passing through the fourth rear passage 292, and to the downstream side. Additionally, under a switching action of the mode switching damper 300, second air (cooled air) that passes through the fifth rear passage 296 is blown from a second vent blow-out port (not shown) in the vicinity of the faces of passengers in the middle seats in the vehicle compartment.

Further, for example, in the vent mode, in the case that the vehicle compartment is to be cooled rapidly, the temperature control dampers 252a, 252b are rotated to become substantially parallel with the third front passage 234 and to block communication between the fifth front passage 250 and the third front passage 234. As a result, cooled air in the third front passage 234 can be supplied to the first vent blow-out port 242 without being raised in temperature. In addition, because the temperature control dampers 252a, 252b suppress flow passage resistance when cool air flows through the third front passage 234, low electrical power consumption of the first blower fan 272 is realized, along with reducing noise. Furthermore, the cooling vent damper 240, by establishing communication between the second front passage 232 and the third front passage 234, increases the blowing rate of the first air (cooled air) that flows from the second front passage 232 to the third front passage 234, thereby enabling the vehicle compartment to be cooled rapidly by the first air, which is blown out from the first vent blow-out port 242 and the second vent blow-out port (not shown).

Next, in the case that a bi-level mode is selected for blowing air in the vicinity of faces and feet of passengers in the vehicle compartment, the first air mixing damper 238 is rotated somewhat more toward the side of the third front passage 234 than the position thereof during the aforementioned vent mode. Furthermore, the temperature control dampers 252a, 252b are rotated, whereupon air heated by the heater core 210 is supplied into the third front passage 234 from the fifth front passage 250. At this time, the vent damper 244 is positioned at an intermediate position between the first vent blow-out port 242 and the opening of the sixth front passage 256, while the defroster blow-out port 260 is blocked by the defroster damper 262.

Further, one end of the temperature control dampers 252a, 252b, which are made up of butterfly valves, projects about the support shaft toward the side of the third front passage 234 (in the direction of arrow A), whereas the lower end side thereof is rotated to project toward the side of the fifth front passage 250 (in the direction of arrow B), and is tilted at a predetermined angle such that the third front passage 234 side thereof is inclined upwardly, and the fifth front passage 250 side thereof is inclined downwardly. Owing thereto, warm air is guided to the rearward side in the third front passage 234 along the temperature control dampers 252a, 252b, and the warm air, without being mixed with cooled air, is supplied to the heat passage 264 from the opened sixth front passage 256 and through the seventh front passage 258, and then is blown out in the vicinity of the feet of passengers riding in the front seats in the vehicle compartment from a first heat blow-out port (not shown).

On the other hand, because the first vent blow-out port 242 is disposed upwardly of the third front passage 234, a portion of the first air (cooled air) that passes through the evaporator 208 and is supplied from the second front passage 232 to the third front passage 234 is blown in the vicinity of the faces of passengers directly from the first vent blow-out port 242, without being mixed with the heated air.

More specifically, in the bi-level mode, because warm air can be guided suitably by the temperature control dampers 252a, 252b effectively to the side of the sixth front passage 256 that communicates with the first heat blow-out port (not shown), lowering in temperature of the warm air by mixing with cooled air can be suppressed. In addition, rising in temperature of the cooled air by mixing with the heated air can be suppressed as well. As a result, the temperature difference between the mixed air that is blown in the vicinity of faces of the passengers from the first vent blow-out port 242 and the mixed air that is blown in the vicinity of the feet of passengers from the first heat blow-out port is made greater, and comfort can be enhanced.

Furthermore, at the same time, the second air mixing damper 294 is rotated in a direction to separate slightly away from the heater core 210, and moreover, the mode switching damper 300 is rotated to an intermediate position in the interior of the fourth rear passage 292. Additionally, concerning the second air, warm air that is heated by the heater core 210, and cooled air that is supplied from the third rear passage 290 to the fourth rear passage 292 through the opening are mixed together. The mixed air, after passing through the second vent blow-out port (not shown) from the fifth rear passage 296, is blown out in the vicinity of faces of passengers riding in the middle seats in the vehicle compartment, and together therewith, after passing through the second and third heat blow-out ports (not shown) from the sixth rear passage 298, is blown out in the vicinity of the feet of passengers riding in the middle and rear seats in the vehicle compartment.

Moreover, the sub-defroster damper 254 may be rotated so as to establish communication between the fifth front passage 250 and the sixth front passage 256. In accordance therewith, first air is added, which passes through the heater core 210 and is supplied to the sixth front passage 256 via the third front passage 234, and since the first air can be supplied directly into the sixth front passage 256, it is possible to increase the blowing rate of warm air that is blown from the first heat blow-out port (not shown) in the vicinity of the feet of passengers riding in the front seats of the vehicle compartment. Stated otherwise, warm air that is blown in the vicinity of the feet of passengers can be supplied at a more stable temperature.

Next, in the case that a heat mode is selected for blowing air in the vicinity of the feet of passengers in the vehicle compartment, in comparison to the bi-level mode, the first air mixing damper 238 is rotated further to the side of the third front passage 234. Further, the temperature control dampers 252a, 252b are rotated somewhat to place the third front passage 234 and the fifth front passage 250 in communication. Furthermore, the cooling vent damper 240 blocks communication between the second front passage 232 and the third front passage 234, and together therewith, the vent damper 244 and the defroster damper 262 are rotated respectively to block the first vent blow-out port 242 and the defroster blow-out port 260.

Consequently, heated first air that has passed through the heater core 210 is supplied from the fifth front passage 250 to the third front passage 234. First air (cooled air) and first air (heated air) are mixed together in the third front passage 234, whereupon the mixed air flows rearwardly through the sixth and seventh front passages 256, 258, is supplied to the heat passage 264, and is blown out from the non-illustrated first heat blow-out port in the vicinity of the feet of passengers riding in the front seats in the vehicle compartment.

Further, similar to the case of the aforementioned bi-level mode, the sub-defroster damper 254 may be rotated to establish communication between the fifth front passage 250 and the sixth front passage 256. In accordance therewith, since heated air that has passed through the heater core 210 can be supplied directly into the sixth front passage 256, it is possible to increase the blowing rate of the first air that is blown from the first heat blow-out port (not shown).

On the other hand, the second air mixing damper 294 is rotated in a direction to separate further away from the heater core 210 compared to the case of the bi-level mode, and further, the mode switching damper 300 is positioned to block the fifth rear passage 296. Consequently, the second air (mixed air) made up of cooled air and heated air which is mixed in the fourth rear passage 292, after passing through the sixth rear passage 298 from the fourth rear passage 292, is supplied to the second and third heat blow-out ports (not shown), where it is blown in the vicinity of the feet of passengers riding in the middle and rear seats in the vehicle compartment.

Next, an explanation shall be made concerning a heat/defroster mode, in which air is blown in the vicinity of the feet of passengers in the vehicle compartment and in the vicinity of the front window for eliminating fog (condensation) from the front window. In the case that the heat/defroster mode is selected, the defroster damper 262 is rotated in a direction to separate from the defroster blow-out port 260, and together therewith, the first vent blow-out port 242 is blocked by the vent damper 244 (refer to the solid line in FIG. 2). As a result, a portion of the first air (mixed air), which is mixed in the third front passage 234 and the sixth front passage 256, is blown in the vicinity of the front window of the vehicle through the defroster blow-out port 260, while the other portion of the first air (mixed air), after passing through the sixth and seventh front passages 256, 258, is blown in the vicinity of the feet of passengers in the front seats in the vehicle compartment from the heat passage 264 and the first heat blow-out port (not shown).

On the other hand, in the heat/defroster mode, in the case that second air is blown to the middle and rear seats in the vehicle compartment, handling thereof is carried out in the same manner as the above-described heat mode, and therefore detailed descriptions of this aspect of the heat/defroster mode are omitted.

Lastly, an explanation shall be made concerning a defroster mode, in which blowing of air only in the vicinity of the front window is carried out for eliminating fog (condensation) from the front window. In this case, the first air mixing damper 238 and the cooling vent damper 240 block communication between the second front passage 232 and the third front passage 234, and the vent damper 244 is rotated to block the first vent blow-out port 242. Consequently, heated first air that has passed through the heater core 210 is supplied from the fifth front passage 250, past the third front passage 234, and to the sixth front passage 256. Additionally, since the defroster damper 262 is rotated and communication is blocked between the sixth front passage 256 and the seventh front passage 258, the first air (warm air) is supplied from the sixth front passage 256 to the opened defroster blow-out port 260, and is blown in the vicinity of the front window of the vehicle. In this case, the defroster mode can be handled by blowing the first air only, which is supplied from the first blower unit 206, without driving the second blower unit 212.

Further, as mentioned above, under a switching action of the communication switching dampers 288a, 288b, by placing the second rear passage 286 and the second front passage 232 in communication, second air that is supplied from the second blower unit 212 can also be used for carrying out the defroster mode, by supplying the second air to the second front passage 232.

Still further, as mentioned above, by rotating the sub-defroster damper 254 in a direction to separate away from the sixth front passage 256, and thus directly placing the fifth front passage 250 and the sixth front passage 256 in communication, heated air that has passed through the heater core 210 may be supplied directly into the sixth front passage 256 without flowing through the third front passage 234. Consequently, the amount of warm air that is introduced to the sixth front passage 256 can be increased, and the blowing rate of air that is blown out from the defroster blow-out port 260 can be increased advantageously.

In the foregoing manner, according to the present embodiment, in a vehicular air conditioning apparatus having a casing 202, an evaporator 208, a heater core 210, a first blower unit 206 and a second blower unit 212, and an opening 266a which is capable of introducing air from the vehicle exterior, an intake damper 270 for performing switching between internal and external air, and an adjustment damper 268 for adjusting an introduction rate of the external air are provided as a damper mechanism. The adjustment damper 268 is disposed more closely on the side of the opening 266a than the intake damper 270, and the adjustment damper 268 is disposed in the opening 266a so as to confront the inflowing direction of the external air. More specifically, a support shaft 268a is disposed on a downstream side with respect to the opening 266a, and the adjustment damper 268, which is supported by the support shaft 268a, is formed in a confronting relation with respect to the opening 266a.

Owing thereto, switching of internal and external air and adjusting the introduction rate of external air can be carried out by means of separate dampers (an adjustment damper and an intake damper), thus enabling the introduction rate of external air to be finely adjusted.

The vehicular air conditioning apparatus according to the present invention is not limited to the above-described embodiments, and it is a matter of course that various modified or additional structures could be adopted without deviating from the essence and gist of the invention as set forth in the appended claims.

What is claimed is:

1. A vehicular air conditioning apparatus comprising:
   a casing mounted in a vehicle and having a plurality of passages in the interior thereof through which air flows;
   a heat exchanger disposed in the interior of the casing for carrying out heat exchange on the air;
   an internal/external air switching damper disposed in the interior of the casing for performing switching of an external air introducing port for taking in air from an exterior portion of the vehicle, an internal air introducing port for taking in air from an interior portion of the vehicle, and performing switching of internal and external air;
   an adjustment damper disposed upstream from the external air introducing port, for adjusting a supply amount of air introduced into the casing through a communication hole by closing, partially opening, or opening the communication hole; and
   a duct disposed upstream of the adjustment damper for taking in air that is introduced to the interior of the casing,
   wherein the adjustment damper is formed as a plate, an axis of rotation being disposed at one end thereof, and another end thereof on an opposite side from the one end being arranged so as to confront the air that is introduced through the duct; and
   a flat surface of the adjustment damper is arranged substantially parallel to a direction of extension of the duct when the adjustment damper closes the communication hole and stops the airflow through the communication hole, and said another end of the adjustment damper moves away from the communication hole when the adjustment damper opens the communication hole.

2. The vehicular air conditioning apparatus according to claim 1, wherein said another end of the adjustment damper moves away from the communication hole according to a vehicle speed.

3. The vehicular air conditioning apparatus according to claim 1, wherein said another end of the adjustment damper moves away from the communication hole as a vehicle speed becomes smaller.

4. The vehicular air conditioning apparatus according to claim 1, wherein the flat surface of the adjustment damper is rotated upwardly when the adjustment damper opens the communication hole.

5. The vehicular air conditioning apparatus according to claim 1, wherein the flat surface of the adjustment damper is rotated upwardly according to a vehicle speed.

6. The vehicular air conditioning apparatus according to claim 1, wherein the flat surface of the adjustment damper is rotated more upwardly as a vehicle speed becomes smaller.

* * * * *